(12) United States Patent
Murata et al.

(10) Patent No.: US 10,829,862 B2
(45) Date of Patent: Nov. 10, 2020

(54) TIN-PLATED PRODUCT AND METHOD FOR PRODUCING SAME

(71) Applicants: DOWA METALTECH CO., LTD., Tokyo (JP); YAZAKI CORPORATION, Tokyo (JP)

(72) Inventors: Tatsunori Murata, Tokyo (JP); Hirotaka Kotani, Tokyo (JP); Hideki Endo, Tokyo (JP); Akira Sugawara, Tokyo (JP); Yuta Sonoda, Tokyo (JP); Tetsuo Kato, Shizuoka (JP); Hideki Ohsumi, Shizuoka (JP); Jyun Toyoizumi, Shizuoka (JP)

(73) Assignees: DOWA METALTECH CO., LTD., Tokyo (JP); YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/122,568

(22) PCT Filed: Feb. 25, 2015

(86) PCT No.: PCT/JP2015/056271
§ 371 (c)(1),
(2) Date: Aug. 30, 2016

(87) PCT Pub. No.: WO2015/133499
PCT Pub. Date: Sep. 11, 2015

(65) Prior Publication Data
US 2017/0088965 A1    Mar. 30, 2017

(30) Foreign Application Priority Data

Mar. 4, 2014  (JP) ................................. 2014-041170
Feb. 19, 2015  (JP) ................................. 2015-030140

(51) Int. Cl.
C25D 5/50 (2006.01)
B32B 15/01 (2006.01)
(Continued)

(52) U.S. Cl.
CPC ................ C25D 5/12 (2013.01); B32B 15/01 (2013.01); C25D 3/12 (2013.01); C25D 3/32 (2013.01);
(Continued)

(58) Field of Classification Search
None
See application file for complete search history.

(56) References Cited

U.S. PATENT DOCUMENTS 7,824,776 B2    11/2010   Yoshida et al.
2009/0061253 A1  3/2009   Yoshida et al.
(Continued)

FOREIGN PATENT DOCUMENTS

JP    2003-293187 A    10/2003
JP    2006-183068 A    7/2006
(Continued)

OTHER PUBLICATIONS

International Search Report for PCT/JP2015/056271 dated May 26, 2015.

*Primary Examiner* — Adam Krupicka
(74) *Attorney, Agent, or Firm* — Bachman and Lapointe PC; George Coury

(57) ABSTRACT

In a tin-plated product wherein a surface of a substrate 10 of copper or a copper alloy is plated with tin, an underlying layer 12 of at least one of nickel and a copper-nickel alloy is formed on the surface of the substrate 10, and an outermost layer formed on the surface of the underlying layer 12 is composed of a copper-tin alloy layer 14 and tin layers 16, the copper-tin alloy 14 being formed of a large number of
(Continued)

crystal grains of a copper-tin alloy, each of the tin layers 16 being arranged in a corresponding one of recessed portions, each of which is formed between adjacent crystal grains of the large number of crystal grains of the copper-tin alloy, the adjacent crystal grains being adjacent to each other on the outermost surface of the outer most layer, the area ratio occupied by the tin layers 16 on the outermost surface being 20 to 80%, and the maximum thickness of the tin layers 16 being smaller than the average particle diameter of the crystal grains of the copper-tin alloy.

25 Claims, 1 Drawing Sheet

(51) Int. Cl.
*C25D 5/34* (2006.01)
*C25D 5/12* (2006.01)
*C25D 7/00* (2006.01)
*C25D 3/12* (2006.01)
*C25D 3/32* (2006.01)
*C25D 3/38* (2006.01)
*C25F 1/00* (2006.01)

(52) U.S. Cl.
CPC .............. *C25D 3/38* (2013.01); *C25D 5/34* (2013.01); *C25D 5/505* (2013.01); *C25D 7/00* (2013.01); *C25F 1/00* (2013.01)

(56) References Cited

U.S. PATENT DOCUMENTS

| | | |
|---|---|---|
| 2013/0237105 A1 | 9/2013 | Tsuru et al. |
| 2014/0004373 A1 | 1/2014 | Taninouchi et al. |

FOREIGN PATENT DOCUMENTS

| | | |
|---|---|---|
| JP | 2007-063624 A | 3/2007 |
| JP | 2007-247060 A | 9/2007 |
| JP | 2013-185193 A | 9/2013 |

TIN-PLATED PRODUCT AND METHOD FOR PRODUCING SAME

TECHNICAL FIELD

The present invention relates generally to a tin-plated product and a method for producing the same. More specifically, the invention relates to a tin-plated product used as the material of an insertable connecting terminal or the like, and a method for producing the same.

BACKGROUND ART

As conventional materials of insertable connecting terminals, there are used tin-plated products wherein a tin coating layer is formed as the outermost layer of a conductive material, such as copper or a copper alloy. In particular, tin-plated products are used as the materials of information communication equipment for automotive vehicles, portable telephones and personal computers, control substrates for industrial equipment, such as robots, terminals, such as connectors, lead frames, relays and switches, and bus bars, from the points of view of their small contact resistance, contact reliability, corrosion resistance, solderability, economy and so forth.

As such a tin-plated product, there is proposed a plated copper or copper alloy wherein a nickel or nickel alloy layer is formed on the surface of copper or a copper alloy, and a tin or tin alloy layer is formed on the outermost surface side thereof, at least one layer of intermediate layers containing copper and tin as main components or intermediate layers containing copper, nickel and tin as main components being formed between the nickel or nickel alloy layer and the tin or tin alloy layer, and at least one intermediate layer of these intermediate layers containing a layer which contains 50% by weight or less of copper and 20% by weight or less of nickel (see, e.g., Japanese Patent Laid-Open No. 2003-293187).

There is also proposed a conductive material for connecting parts, wherein a copper-tin alloy coating layer, which contains 20 to 70% by atom of copper and which has an average thickness of 0.2 to 3.0 micrometers, and a tin coating layer, which has an average thickness of 0.2 to 5.0 micrometers, are formed on the surface of a base material of a copper plate or bar in this order, and the surface thereof is reflow-treated, the arithmetic average roughness Ra in at least one direction being 0.15 micrometer or more, the arithmetic average roughness Ra in all directions being 3.0 micrometers or less, a part of the copper-tin alloy coating layer being exposed to the surface of the tin coating layer, and the exposed area ratio of the copper-tin alloy coating layer being 3 to 75% with respect to the surface of the conductive material (see, e.g., Japanese Patent Laid-Open No. 2006-183068).

However, in the tin-plated product proposed in Japanese Patent Laid-Open No. 2003-293187, there is a problem in that the insertion force of an insertable connecting terminal or the like is increased during the insertion thereof if the tin-plated product is used as the material of the insertable connecting terminal or the like, although the tin-plated product has good solderability, whisker resistance, heat-resisting reliability and molding workability. In the tin-plated product proposed in Japanese patent Laid-Open No. 2006-183068, the producing costs thereof are increased since a substrate is plated after the surface thereof is roughened in order to decrease the insertion force of an insertable connecting terminal or the like when the tin-plated product is used as the material of the insertable connecting terminal or the like.

DISCLOSURE OF THE INVENTION

It is therefore an object of the present invention to eliminate the aforementioned problems and to provide a tin-plated product which has a low insertion force when it is used as the material of an electric element, such as an insertable connecting terminal, and a method for producing the tin-plated product at low costs.

In order to accomplish the aforementioned object, the inventors have diligently studied and found that it is possible to produce a tin-plated product at low costs, the tin-plated product having a low insertion force when it is used as the material of an electric element, such as an insertable connecting terminal, if there is provided a tin-plated product wherein a surface of a substrate is plated with tin, the tin-plated product comprising: a substrate of copper or a copper alloy; an underlying layer formed on a surface of the substrate, the underlying layer being formed of at least one of nickel and a copper-nickel alloy; and an outermost layer formed on a surface of the underlying layer, the outermost layer being composed of a copper-tin alloy layer and tin layers, the copper-tin alloy layer being formed of a large number of crystal grains of a copper-tin alloy, each of the tin layers being arranged in a corresponding one of recessed portions, each of which is formed between adjacent crystal grains of the large number of crystal grains of the copper-tin alloy, the adjacent crystal grains being adjacent to each other on an outermost surface of the outer most layer, wherein an area ratio occupied by the tin layers on the outermost surface is 20 to 80%, and a maximum thickness of the tin layers is smaller than an average particle diameter of the crystal grains of the copper-tin alloy. Thus, the inventors have made the present invention.

According to the present invention, there is provided a tin-plated product wherein a surface of a substrate is plated with tin, the tin-plated product comprising: a substrate of copper or a copper alloy; an underlying layer formed on a surface of the substrate, the underlying layer being formed of at least one of nickel and a copper-nickel alloy; and an outermost layer formed on a surface of the underlying layer, the outermost layer being composed of a copper-tin alloy layer and tin layers, the copper-tin alloy layer being formed of a large number of crystal grains of a copper-tin alloy, each of the tin layers being arranged in a corresponding one of recessed portions, each of which is formed between adjacent crystal grains of the large number of crystal grains of the copper-tin alloy, the adjacent crystal grains being adjacent to each other on an outermost surface of the outer most layer, wherein an area ratio occupied by the tin layers on the outermost surface is 20 to 80%, and a maximum thickness of the tin layers is smaller than an average particle diameter of the crystal grains of the copper-tin alloy.

In this tin-plated product, the copper-tin alloy layer is preferably formed of a copper-tin alloy and a copper-nickel-tin alloy. In this case, the copper-tin alloy is preferably $Cu_6Sn_5$, and the copper-nickel-tin alloy is preferably $(Cu,Ni)_6Sn_5$. The crystal grains of the copper-tin alloy preferably have an average particle diameter of 1.5 to 3 micrometers. The tin layers preferably have a maximum thickness of 0.2 to 1.0 micrometers, and the tin layers preferably have an average thickness of 0.05 to 0.4 micrometers. The copper-tin alloy layer preferably has a thickness of 0.4 to 1.5 micrometers, and the underlying layer preferably has a thickness of 0.05 to 0.5 micrometers. The outermost surface preferably has an arithmetic average roughness Ra of 0.05 to 0.2 micrometers and a maximum height Ry of 0.3 to 1.5 micrometers.

According to the present invention, there is provided a method for producing a tin-plated product, the method comprising the steps of: treating a surface of a substrate of copper or a copper alloy; forming a nickel plating layer, a copper plating layer and a tin plating layer on the treated surface of the substrate in this order; and thereafter, carrying out a heat treatment to form an outermost layer being composed of a copper-tin alloy layer and tin layers, the copper-tin alloy layer being formed of a large number of crystal grains of a copper-tin alloy, each of the tin layers being arranged in a corresponding one of recessed portions, each of which is formed between adjacent crystal grains of the large number of crystal grains of the copper-tin alloy, the adjacent crystal grains being adjacent to each other on an outermost surface of the outermost layer, the heat treatment causing an area ratio occupied by the tin layers on the outermost surface to be 20 to 80% and causing a maximum thickness of the tin layers to be smaller than an average particle diameter of the crystal grains of the copper-tin alloy.

In this method for producing a tin-plated product, the treatment of the surface of the substrate preferably causes the surface of the substrate to have an arithmetic average roughness Ra of 0.05 to 0.2 micrometers, a maximum height Ry of 0.4 to 1.5 micrometers and a ten-point average roughness Rz of 0.15 to 1.0 micrometers. The nickel plating layer preferably has a thickness of 0.05 to 0.5 micrometers, the copper plating layer preferably has a thickness of 0.1 to 0.7 micrometers, and the tin plating layer preferably has a thickness of 0.5 to 1.5 micrometers. The ratio of the thickness of the tin plating layer to the thickness of the copper plating layer is preferably 1.5 to 5, and the ratio of the thickness of the tin plating layer to the sum of the thickness of the copper plating layer and the thickness of the nickel plating layer is preferably 1 to 3.5. The heat treatment is preferably carried out by setting temperature and time in a temperature range of 300 to 800° C. so as to cause the average particle diameter of the crystal grains of the copper-tin alloy to be 1.5 to 3 micrometers while causing the maximum thickness of the tin layers to be 0.2 to 1.0 micrometers.

The heat treatment is preferably carried out by setting temperature and time in a temperature range of 300 to 800° C. so as to cause the tin layers to have an average thickness of 0.05 to 0.4 micrometers. In this case, the temperature and time in the heat treatment are preferably set so that the thickness (μm) of the tin plating layer consumed after being melted by the heat treatment is {thickness (μm) of tin plating layer before heat treatment−0.7 (μm)} or more and to be {thickness (μm) of tin plating layer before heat treatment−0.35 (μm)} or less.

According to the present invention, there is provided an electrical element which uses the above-described tin-plated product as the material thereof.

According to the present invention, it is possible to produce a tin-plated product at low costs, the tin-plated product having a low insertion force when it is used as the material of an electric element, such as an insertable connecting terminal.

BEST MODE FOR CARRYING OUT THE INVENTION

Figure 1:
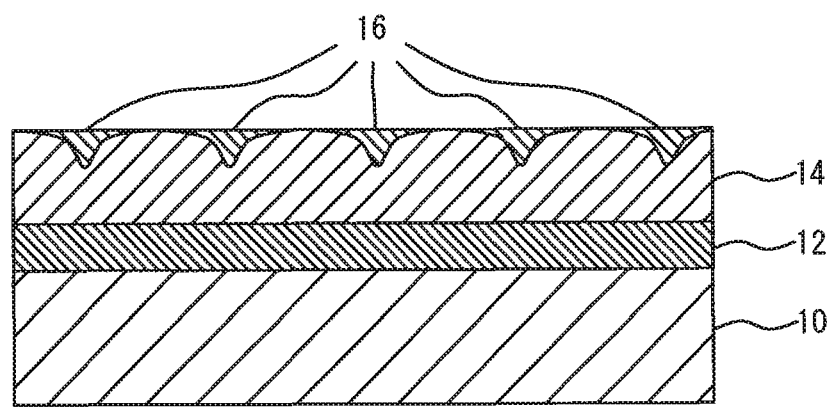
FIG. 1 is a sectional view schematically showing the preferred embodiment of a tin-plated product according to the present invention.

In the preferred embodiment of a tin-plated product according to the present invention wherein a surface of a substrate 10 of copper or a copper alloy is plated with tin, as shown in FIG. 1, an underlying layer 12 is formed on the surface of the substrate 10, the underlying layer 12 being formed of at least one of nickel and a copper-nickel alloy, and an outermost layer is formed on a surface of the underlying layer 12, the outermost layer being composed of a copper-tin alloy layer 14 and tin layers 16, the copper-tin alloy layer 14 being formed of a large number of crystal grains of a copper-tin alloy, each of the tin layers 16 being arranged in a corresponding one of recessed portions, each of which is formed between adjacent crystal grains of the large number of crystal grains of the copper-tin alloy, the adjacent crystal grains being adjacent to each other on an outermost surface of the outer most layer, the area ratio occupied by the tin layers 16 on the outermost surface being 20 to 80% (preferably 30 to 75%, more preferably 30 to 70%), and the maximum thickness of the tin layers 16 being smaller than an average particle diameter of the crystal grains of the copper-tin alloy. If a tin-plated product with such a construction is used as the material of an insertable connecting terminal, it is possible to prevent the biting of the copper-tin alloy layer of the outermost layer to produce a connecting terminal which has a low insertion force and which has a low electrical resistance during minute sliding.

In this tin-plated product, the copper-tin alloy layer 14 is preferably formed of a copper-tin alloy and a copper-nickel-tin alloy. In this case, the copper-tin alloy is preferably $Cu_6Sn_5$, and the copper-nickel-tin alloy is preferably $(Cu, Ni)_6Sn_5$ (an intermetallic compound wherein Ni exists in $Cu_6Sn_5$). The crystal grains of the copper-tin alloy preferably have an average particle diameter of 1.5 to 3 micrometers. The tin layers 16 preferably have a maximum thickness of 0.2 to 1.0 micrometers, and more preferably have a maximum thickness of 0.3 to 0.9 micrometers. The ratio (D/T) of the average particle diameter (D) of the crystal grains of the copper-tin alloy layer of the outermost layer to the maximum thickness (T) of the tin layers 16 is preferably 1.5 to 10, more preferably 2 to 7, and most preferably 2 to 6. The tin layers 16 preferably have an average thickness of 0.05 to 0.4 micrometers, and more preferably an average thickness of 0.05 to 0.3 micrometers. The copper-tin alloy layer 14 preferably has a thickness of 0.4 to 1.5 micrometers, and more preferably has a thickness of 0.5 to 1.2 micrometers. The underlying layer 12 preferably has a thickness of 0.05 to 0.5 micrometers, and more preferably has a thickness of 0.1 to 0.4 micrometers. The outermost surface preferably has an arithmetic average roughness Ra of 0.05 to 0.2 micrometers and a maximum height Ry of 0.3 to 1.5 micrometers.

Thus, in the preferred embodiment of a tin-plated product according to the present invention, the underlying layer 12 of at least one of nickel and the copper-nickel alloy is formed on the surface of the substrate 10, the outermost layer of the copper-tin alloy layer 14 and the tin layers 16 being formed on the surface of the underlying layer 12, and no layer of copper preferably exists between the underlying layer 12 and the outermost layer as an intermediate layer.

Figure 2:
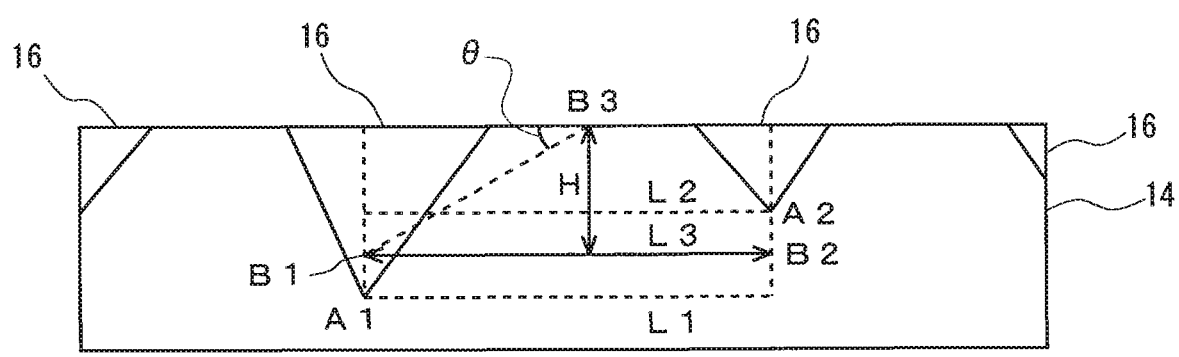
FIG. 2 is a view illustrating an angle θ between the outermost surface of a copper-tin alloy layer and a straight line, which passes through the point of the maximum depth of a tin layer and the intersection point of the outermost surface and a substantially central portion of the copper-tin alloy layer adjacent to the tin layer, on a cross-section substantially perpendicular to the outermost surface of the preferred embodiment of a tin-plated product according to the present invention.

On a cross-section substantially perpendicular to the outermost surface of the tin-plated product, an angle θ between the outermost surface of the copper-tin alloy layer and a straight line, which passes through the point of the maximum depth of a tin layer and the intersection point of the outermost surface and a substantially central portion of the copper-tin alloy layer adjacent to the tin layer, is preferably 25 to 45. That is, as shown in FIG. 2, on the cross-section substantially perpendicular to the outermost surface of the tin-plate product, a straight line L1 parallel to the outermost surface is drawn from a point A1, at which a crystal grain of the copper-tin alloy of the copper-tin alloy layer 14 contacts one of the crystal grains of the copper-tin alloy on both sides thereof and at which the depth of a tin layer 16 between these crystal grains is maximum. Then, a straight line L2 parallel to the outermost surface is drawn from at a point A2, at which the crystal grain of the copper-tin alloy of the copper-tin alloy layer 14 contacts the other of the crystal grains of the copper-tin alloy on both sides thereof and at which the depth of a tin layer 16 between these crystal grains is maximum. Then, a straight line L3 parallel to the outermost surface is drawn so as to have the same distance from both of the straight lines L1 and L2 between the straight lines L1 and L2 (the straight line L3 denotes an average depth of the points A1 and A2, at which the depth of each of the tin layers 16 on both sides of a crystal grain of the copper-tin alloy is maximum). Then, there are obtained an intersection point B1 of the straight line L3 and a normal to the outermost surface being drawn so as to pass through the point A1, and an intersection point B2 of the straight line L3 and a normal to the outermost surface being drawn so as to pass through the point A2. Then, there is obtained an intersection point B3 of the outermost surface and a normal to the outermost surface being drawn from a middle point of a line segment between the intersection points B1 and B2. The angle θ between the outermost surface and a straight line drawn between the intersection points B1 and B3 is preferably 25 to 45°. For example, this angle θ can be calculated as follows. First, the tin-plated product is cut by a focused ion beam (FIB) instrument to expose a cross-section substantially perpendicular to the outermost surface of the tin-plated product and parallel to the rolling direction thereof (or a cross-section substantially perpendicular to the outermost surface of the tin-plated product and perpendicular to the rolling direction thereof) as a cross-section substantially perpendicular to the outermost surface of the tin-plated product. Then, the cross-section is observed (for example, at a magnification of 10,000) by means of a scanning electron microscope (SEM). The angle θ can be calculated from tan θ=H/(L/2) since tan θ is substantially equal to H/(L/2) assuming that L is the length of the line segment between the intersection points B1 and B2 shown in FIG. 2 and that H is the length between a middle point (between the intersection points B1 and B2) and the intersection point of the outermost surface and a normal to the outermost surface, the normal being drawn from the middle point between the intersection points B1 and B2.

The preferred embodiment of a method for producing a tin-plated product according to the present invention, comprises the steps of: treating a surface of a substrate of copper or a copper alloy; forming a nickel plating layer, a copper plating layer and a tin plating layer on the treated surface of the substrate in this order; and thereafter, carrying out a heat treatment to form an outermost layer being composed of a copper-tin alloy layer of and tin layers, the copper-tin alloy layer being formed of a large number of crystal grains of a copper-tin alloy, each of the tin layers being arranged in a corresponding one of recessed portions, each of which is formed between adjacent crystal grains of the large number of crystal grains of the copper-tin alloy, the adjacent crystal grains being adjacent to each other on an outermost surface of the outermost layer, the heat treatment causing an area ratio occupied by the tin layers on the outermost surface to be 20 to 80% (preferably 30 to 75%, more preferably 30 to 70%) and causing a maximum thickness of the tin layers to be smaller than an average particle diameter of the crystal grains of the copper-tin alloy.

In this method for producing a tin-plated product, the treatment of the surface of the substrate preferably causes the surface of the substrate to have an arithmetic average roughness Ra of 0.05 to 0.2 micrometers, a maximum height Ry of 0.4 to 1.5 micrometers and a ten-point average roughness Rz of 0.15 to 1.0 micrometers. As a method for thus treating the surface of the substrate in order to decrease the unevenness of the surface of the substrate by decreasing the surface roughness of the substrate (to a desired value), there can be utilized a chemical polishing, such as electrolytic polishing, the rolling of the substrate using a work roll having a surface roughness decreased by polishing or the like, a mechanical polishing, such as buff or blast, and so forth.

The nickel plating layer preferably has a thickness of 0.05 to 0.5 micrometers, and more preferably has a thickness of 0.05 to 0.4 micrometers. The copper plating layer preferably has a thickness of 0.1 to 0.7 micrometers, and more preferably has a thickness of 0.1 to 0.5 micrometers. The tin plating layer preferably has a thickness of 0.5 to 1.5 micrometers, and more preferably has a thickness of 0.6 to 1.2 micrometers. The ratio (Sn thickness/Cu thickness) of the thickness of the tin plating layer to the thickness of the copper plating layer is preferably 1.5 to 5, and more preferably 2 to 5. The ratio (Sn thickness/(Cu thickness+Ni thickness)) of the thickness of the tin plating layer to the sum of the thickness of the copper plating layer and the thickness of the nickel plating layer is preferably 1 to 3.5.

The heat treatment is preferably carried out at a temperature of 300 to 800° C. for 1 to 1800 seconds in the atmosphere (until the heat treatment forms an outermost layer being composed of a copper-tin alloy layer and tin layers, the copper-tin alloy layer being formed of a large number of crystal grains of a copper-tin alloy, each of the tin layers being arranged in a corresponding one of recessed portions, each of which is formed between adjacent crystal grains of the large number of crystal grains of the copper-tin alloy, the adjacent crystal grains being adjacent to each other on an outermost surface of the outermost layer, the heat treatment causing an area ratio occupied by the tin layers on the outermost surface to be 20 to 80% and causing a maximum thickness of the tin layers to be smaller than an average particle diameter of the crystal grains of the copper-tin alloy). The heat treatment is preferably carried out by setting temperature and time in a temperature range of 300 to 800° C. so as to cause the average particle diameter of the crystal grains of the copper-tin alloy to be 1.5 to 3 micrometers while causing the maximum thickness of the tin layers to be 0.2 to 1.0 micrometers.

The heat treatment is more preferably carried out by setting temperature and time in a temperature range of 300 to 800° C. so as to cause the tin layers to have an average thickness of 0.05 to 0.4 micrometers (in order to decrease the amount of adhesion at the contact point when the tin-plated product is used as the material of an insertable connecting terminal or the like). If the heat treatment is continued until the average thickness of the tin layers remaining after melting tin is 0.05 to 0.4 micrometers, it is possible to cause the average thickness of the tin layers to be 0.05 to 0.4 micrometers by the heat treatment in the temperature range of 300 to 800° C. That is, if the heat treatment is carried out in the temperature range of 300 to 800° C. after the nickel plating layer, the copper plating layer and the tin plating layer are formed on the surface of the substrate in this order, the thickness of the tin plating layer, which is consumed until a temperature (232° C.) reaching the melting point of tin, is 0.3 micrometers (as a value evaluated in a previous experiment), and the thickness of the tin plating layer, which is consumed by the diffusion of liquid tin after melting tin, is $\{2 \times \text{diffusion coefficient D } (m^2/s) \times \text{holding time t (s)}\}^{1/2}$ (m). Therefore, if the temperature and time in the heat treatment are set so as to satisfy {thickness $T_{s_n}$ (μm) of tin plating layer before heat treatment−thickness (0.3 μm) of tin plating layer consumed until melting of tin−average thickness (0.4 μm) of tin plating layer remaining after melting tin}≤$(2 \times \text{diffusion coefficient D} \times \text{holding time t})^{1/2}$ (μm) ≤{thickness $T_{s_n}$ (μm) of tin plating layer before heat treatment−thickness (0.3 μm) of tin plating layer consumed until melting of tin−average thickness (0.05 μm) of tin plating layer remaining after melting tin}, it is possible to cause the average thickness of the tin layers to be 0.05 to 0.4 micrometers by the heat treatment. That is, if the temperature and time in the heat treatment are set so that the thickness (μm) of the tin plating layer consumed after melting the tin plating layer by the heat treatment is not less than {thickness $T_{s_n}$ (μm) of tin plating layer before heat treatment−0.7 (μm)} and is not greater than {thickness $T_{s_n}$ (m) of tin plating layer before heat treatment−0.35 (μm)}, it is possible to cause the average thickness of the tin layers to be 0.05 to 0.4 micrometers by the heat treatment. Furthermore, since the diffusion coefficient D ($m^2/s$) is $D=D_0 \exp(-Q/RT)$ from the frequency factor $D_0$ (=$1.7 \times 10^{-15}$ ($m^2/s$)), the activation energy Q (=−19.4 (J/mol)), the gas constant (=8.314 J/mol*K) and the temperature T (K), the thickness (μm) of the tin plating layer consumed after melting the tin plating layer by the heat treatment is a function of temperature and time, so that it is possible to set the temperature and time in the heat treatment.

Examples of a tin-plated product and a method for producing the same according to the present invention will be described below in detail.

Example 1

First, there was prepared a conductive substrate plate of a Cu—Ni—Sn—P alloy (a substrate of a copper alloy comprising 1.0% by weight of nickel, 0.9% by weight of tin, 0.05% by weight of phosphorus and the balance being copper) having a thickness of 0.25 mm. The surface of the substrate is treated by a rolling mill roll of a ceramic (a rolling mill roll polished with a grinding stone (#400) by means of a rolling mill roll grinding machine to decrease the maximum height Ry and ten-point average roughness Rz of the surface thereof) to decrease the surface roughness of the substrate. With respect to the surface roughness of the substrate thus surface-treated, the arithmetic average roughness Ra, maximum height Ry and ten-point average roughness Rz, which were parameters exhibiting the surface roughness, were calculated on the basis of JIS B0601 (1994) from the results measured in directions perpendicular to the rolling direction on the rolling surface by means of a contact surface roughness measuring apparatus (Surfcoder SE4000 produced by Kosaka Laboratory Ltd.). As a result, the arithmetic average roughness Ra was 0.15 micrometers, the maximum height Ry was 1.05 micrometers, and the ten-point average roughness Rz was 0.71 micrometers. By means of the contact surface roughness measuring apparatus (Surfcoder SE4000 produced by Kosaka Laboratory Ltd.), the average interval Sm between adjacent concavities or convexities on the surface of the substrate was measured. As a result, the average interval Sm was 80 micrometers.

Then, as a pretreatment, the substrate (a material to be plated) thus surface-treated was electrolytic-degreased for 10 seconds with an alkali electrolytic-degreasing solution, and then, washed with water. Thereafter, the substrate was immersed in 5% by weight of sulfuric acid for 10 seconds to be pickled, and then, washed with water.

Then, the substrate (the material to be plated) thus surface-treated and a nickel electrode plate were used as a cathode and an anode, respectively, to electroplate the substrate at a current density of 5 A/dm² and a liquid temperature of 50° C. for 5 seconds in a nickel plating solution containing 80 g/L of nickel sulfamate and 45 g/L of boric acid to form a nickel plating layer having a thickness of 0.1 micrometers on the substrate.

Then, the substrate thus nickel-plated and a copper electrode plate were used as a cathode and an anode, respectively, to electroplate the substrate at a current density of 5 A/dm² and a liquid temperature of 30° C. for 16 seconds in a copper plating solution containing 110 g/L of copper sulfate and 100 g/L of sulfuric acid to form a copper plating layer having a thickness of 0.4 micrometers on the substrate.

Then, the substrate thus copper-plated and a tin electrode plate were used as a cathode and an anode, respectively, to electroplate the substrate at a current density of 5 A/dm² and a liquid temperature of 25° C. for 20 seconds in a tin plating solution containing 60 g/L of tin sulfate, 75 g/L of sulfuric acid, 30 g/L of cresol sulfonic acid and 1 g/L of β-naphthol to form a tin plating layer having a thickness of 1.0 micrometers on the substrate.

In the plated product after being plated with tin, the ratio of the thickness of the tin plating layer to the thickness of the copper plating layer was 2.5, and the ratio of the tin plating layer to the sum of the thickness of the copper plating layer and the thickness of the nickel plating layer was 2.

Then, the plated product after being plated with tin was washed and dried, and then, put in a bright annealing furnace (produced by Koyo Lindberg Co., Ltd.) in which the plated product was held at a temperature in furnace of 400° C. for 150 seconds in the atmosphere to be heat-treated. Furthermore, in this example, during the holding time of 150 seconds in the heat treatment, the holding time after melting tin was calculated to be 90 seconds. The average thickness of tin consumed after melting tin was calculated to be 0.37 micrometers.

The outermost layer formed on the outermost surface side of a tin-plated product thus produced was analyzed by electron probe microanalysis (EPMA) and Auger electron spectroscopy (AES). As a result, it was confirmed that the outermost layer was composed of Sn and $Cu_6Sn_5$ (copper-tin alloy) and that recessed portions were formed (between adjacent crystal grains of the copper-tin alloy) on the surface of the copper-tin alloy layer formed of the crystal grains of the copper-tin alloy, each of the recessed portions having a tin layer therein, so that the copper-tin alloy layer and the tin layers existed on the outermost surface. The thicknesses of these layers were measured by an electrolytic film thickness meter (Thickness Tester TH-11 produced by Chuo Seisakusho Ltd.). As a result, the average thickness of the tin layers was 0.23 micrometers, and the thickness of the copper-tin alloy layer was 0.90 micrometers. After the tin layers on the surface of the tin-plated product was peeled off with a tin peeling solution (containing p-nitrophenol and caustic soda), the crystal grain size of the copper-tin alloy on the exposed surface was obtained in accordance with the cutting method based on JIS H0501, and the average particle diameter of the crystal grains of the copper-tin alloy on the outermost surface was calculated. As a result, the average particle diameter thereof was 2.8 micrometers.

The underlying layer formed on the surface of the substrate of the tin-plated product was analyzed by AES. As a result, the underlying layer was composed of at least one of nickel and a copper-nickel alloy, and the thickness of the underlying layer was 0.10 micrometers. The presence of an intermediate layer between the outermost layer and underlying layer of the tin-plated product was analyzed by AES. As a result, no copper layer existed as the intermediate layer, so that the outermost layer was formed on the surface of the underlying layer.

After gold was deposited on the outermost surface of the tin-plated product so as to have a thickness of about 200 nanometers, the tin-plated product was cut by a focused ion beam (FIB) instrument to expose a cross-section perpendicular to the rolling direction of the tin-plated product. Then, ten points on the exposed cross-section were observed at a magnification of 5,000 in a visual field having a length L (=20 micrometers) parallel to the surface of the tin-plated product by means of a scanning electron microscope (SEM). In each of the observed regions, the total (Lm) of lengths of the copper-tin alloy layer contacting the evaporated gold layer was subtracted from the length L (=20 micrometers) of the whole region to be divided by the length L of the whole region to obtain a value (a ratio (=(L−Lm)/L) of the length of the tin layer contacting the evaporated gold layer in the observed region), and then, an average value of the values (the ratio (L−Lm)/L) obtained in eight observed regions, except for the maximum and minimum values in the ten observed regions, was multiplied by 100 to calculate a value as the area ratio of tin (the area occupied by the tin layer on the outermost surface). As a result, the area ratio of tin was 57%.

Then, the tin-plated product was cut by a focused ion beam (FIB) instrument to expose a cross-section perpendicular to the rolling direction of the tin-plated product. Then, three points on the cross-section were observed at a magnification of 5,000 in a visual field having a length of about 30 micrometers parallel to the surface of the tin-plated product by means of a scanning electron microscope (SEM) to obtain the maximum depth in the recessed portions (the maximum thickness of the tin layer (the depth at which pure tin existed)). As a result, the maximum depth of the recessed portions was 0.75 micrometers. Furthermore, the ratio (D/T) of the average particle diameter (D) of the crystal grains of the copper-tin alloy of the outermost layer to the maximum thickness (T) of the tin layer was calculated. As a result, the ratio (D/T) was 3.73.

With respect to the surface roughness of the tin-plated product, the arithmetic average roughness Ra and maximum height Ry thereof were calculated by the same method as the above-described method. As a result, the arithmetic average roughness Ra on the surface of the tin-plated product was 0.16 micrometers, and the maximum height Ry thereof was 1.13 micrometers.

Then, the tin-plated product was cut by a focused ion beam (FIB) instrument to expose two cross-sections substantially perpendicular to the outermost surface of the tin-plated product and parallel to the rolling direction thereof, and two cross-sections substantially perpendicular to the outermost surface of the tin-plated product and perpendicular to the rolling direction thereof, as cross-sections substantially perpendicular to the outermost surface of the tin-plated product. Each of the cross-sections was observed at a magnification of 10,000 by means of a scanning electron microscope (SEM). From the observation of these cross-sections, it was confirmed that a copper-tin alloy layer and tin layers of tin existed on the outermost surface of the tin-plated product, the copper-tin alloy layer being formed of crystal grains of a copper-tin alloy, each of the tin layers being formed between adjacent crystal grains of the copper-tin alloy. On each of the cross-sections, as shown in FIG. 2, a straight line L1 parallel to the outermost surface was drawn from a point A1, at which a crystal grain of the copper-tin alloy of the copper-tin alloy layer 14 contacted one of crystal grains of the copper-tin alloy on both sides thereof and at which the depth of a tin layer 16 between these crystal grains was maximum. Then, a straight line L2 parallel to the outermost surface was drawn from at a point A2, at which the crystal grain of the copper-tin alloy of the copper-tin alloy layer 14 contacted the other of the crystal grains of the copper-tin alloy on both sides thereof and at which the depth of a tin layer 16 between these crystal grains was maximum. Then, a straight line L3 parallel to the outermost surface was drawn so as to have the same distance from both of the straight lines L1 and L2 between the straight lines L1 and L2. Then, there were obtained an intersection point B1 of the straight line L3 and a normal to the outermost surface being drawn to pass through the point A1, and an intersection point B2 of the straight line L3 and a normal to the outermost surface being drawn to pass through the point A2. Then, there was obtained an intersection point B3 of the outermost surface and a normal to the outermost surface being drawn from a middle point of a line segment between the intersection points B1 and B2. Then, there was calculated an angle θ between the outermost surface and a straight line drawn between the intersection points B1 and B3. As a result, an average value of the angles θ on the cross-sections was 27.7°. Furthermore, the angle θ was calculated from $\tan \theta = H/(L/2)$ since $\tan \theta$ was substantially equal to $H/(L/2)$ assuming that L was the length of the line segment between the intersection points B1 and B2 and that H was the length between a middle point (between the intersection points B1 and B2) and the intersection point B3 of the outermost surface and a normal to the outermost surface, the normal being drawn from the middle point between the intersection points B1 and B2.

In order to evaluate the insertion force of the tin-plated product when it is used as the material of an insertable connecting terminal or the like, the tin-plated product as a sample to be evaluated was fixed on a horizontal table of a horizontal load measuring apparatus (an apparatus produced by combining an electric contact simulator produced by Yamazaki Seiki Co., Ltd., a stage controller, a load cell and a load cell amplifier) to cause the tin-plated product to contact an indenter, and then, the tin-plated product was horizontally pulled at a frictional speed of 80 mm/min by a sliding distance of 10 mm while the indenter was pressed against the surface of the tin-plated product at a load of 0.7

N and 5 N, respectively. Then, forces applied in the horizontal direction from 1 mm to 4 mm (measuring distance of 3 mm) were measured to calculate an average value F thereof, and the coefficient (μ) of dynamic friction between the test pieces was calculated from μ=F/N. As a result, when the load was 0.7 N and 5 N, the coefficient of dynamic friction was 0.25 and 0.23, respectively.

The contact resistance of a test piece cut off from the tin-plated product was measured. As a result, the contact resistance of the tin-plated product was 1.1 mΩ. In order to evaluate the contact reliability of the tin-plated product after being allowed to stand at a high temperature, after a test piece cut off from the tin-plated product was held in a constant temperature chamber at 120° C. for 120 hours in the atmosphere, the test piece was taken out from the constant temperature chamber, and then, the constant resistance of the surface of the test piece (the constant resistance after being allowed to stand at the high temperature) was measured at 20° C. in a measuring room. As a result, the constant resistance after being allowed to stand at the high temperature was 25 mΩ. Furthermore, the constant resistance was measured five times by means of a micro ohm meter (produced by Yamazaki Seiki Co., Ltd.) at an open voltage of 20 mV, a current of 10 mA and a maximum load of 100 gf, using a U-shaped gold wire probe having a diameter of 0.5 mm, with sliding (1 mm/100 gf), and the average value thereof was obtained (when the maximum load of 100 gf was applied).

Then, one of two test pieces cut off from the tin-plated product was used as a plate test piece (a test piece serving as a male terminal), and the other test piece was indented (embossed in semi-spherical shape of R=1 mm) to be used as an indented test piece (a test piece serving as a female terminal). The plate test piece was fixed on the stage of an electrical minute sliding wear testing apparatus, and the indent of the indented test piece was caused to contact the plate test piece. Then, there was carried out a sliding test wherein the stage fixing thereon the plate test piece was reciprocally slid 70 reciprocating times at a frictional speed of one reciprocation per one second in a range of one way of 50 micrometers in horizontal directions while the indented test piece was pressed against the surface of the grooved plate test piece at a load of 0.7 N. After the sliding test, the electrical resistance at the contact point of the grooved plate test piece with the indented test piece was sequentially measured at the four-terminal method. As a result, the maximum value of the electrical resistance of the tin-plated product during the sliding test was a low value of 8.5 mΩ.

Example 2

A tin-plated product was produced by the same method as that in Example 1, except that the thickness of the copper plating layer was 0.2 micrometers. Furthermore, in this example, during the holding time of 150 seconds in the heat treatment, the holding time after melting tin was 90 seconds, so that the thickness of tin consumed after melting tin was calculated to be 0.37 micrometers.

With respect to the tin-plated product thus produced, the analysis of the plating layers, the calculation of the arithmetic average roughness Ra and maximum height Ry of the surface thereof, and the calculation of the average value of the angles θ and the coefficient of dynamic friction were carried out by the same methods as those in Example 1. In addition, the contact resistance of the tin-plated product was obtained by the same method as that in Example 1, and the maximum value of the electrical resistance of the tin-plated product during the sliding test was obtained by the same method as that in Example 1. Furthermore, in the plated product after being plated with tin, the ratio of the thickness of the tin plating layer to the thickness of the copper plating layer was 5, and the ratio of the thickness of the tin plating layer to the sum of the thickness of the copper plating layer and the thickness of nickel plating layer was 3.3.

As a result, it was confirmed that the outermost layer was composed of Sn and $Cu_6Sn_5$ (copper-tin alloy) and that recessed portions were formed (between adjacent crystal grains of the copper-tin alloy) on the surface of the copper-tin alloy layer formed of the crystal grains of the copper-tin alloy, each of the recessed portions having a tin layer of tin therein, so that the copper-tin alloy layer and the tin layers existed on the outermost surface. The thickness of the tin layers was 0.22 micrometers, and the thickness of the copper-tin alloy layer was 0.55 micrometers. It was also confirmed by SEM that the recessed portions (in which tin had remained) were formed on the surface of the copper-tin alloy layer. The average particle diameter of the crystal grains of the copper-tin alloy on the outermost surface was calculated. As a result, the average particle diameter thereof was 1.7 micrometers. Furthermore, the ratio (D/T) of the average particle diameter (D) of the crystal grains of the copper-tin alloy of the outermost layer to the maximum thickness (T) of the tin layer was calculated. As a result, the ratio (D/T) was 3.09. The area (area ratio of tin) occupied by the tin layer on the outermost surface was 56%, and the maximum depth of the recessed portions (the maximum thickness of the tin layers) was 0.55 micrometers.

The underlying layer formed on the surface of the substrate of the tin-plated product was composed of at least one of nickel and a copper-nickel alloy, and the thickness of the underlying layer was 0.10 micrometers. Aa the intermediate layer between the outermost layer and underlying layer of the tin-plated product, no copper layer existed, so that the outermost layer was formed on the surface of the underlying layer.

The arithmetic average roughness Ra of the surface of the tin-plated product was 0.14 micrometers, the maximum height Ry thereof was 0.85 micrometers, and the average value of the angles θ was 38.8°. The coefficient of dynamic friction in the case of the load of 0.7 N and 5 N was 0.29 and 0.24, respectively. The contact resistance of the tin-plated product was 1.5 mΩ, and the contact resistance of the tin-plated product after being allowed to stand at the high temperature was 21 m Ω. The maximum value of the electrical resistance of the tin-plated product during the sliding test was a low value of 18 mΩ.

Example 3

A tin-plated product was produced by the same method as that in Example 1, except that the arithmetic average roughness Ra, maximum height Ry and ten-point average roughness Rz of the substrate after the surface treatment were 0.08 micrometers, 0.69 micrometers and 0.53 micrometers, respectively, and that the thickness of the nickel plating layer was 0.3 micrometers, the thickness of the copper plating layer being 0.3 micrometers, the thickness of the tin plating layer being 0.7 micrometers, and the holding time in the heat treatment being 105 seconds. Furthermore, in this example, during the holding time of 105 seconds in the heat treatment, the holding time after melting tin was 45 seconds, so that the thickness of tin consumed after melting tin was calculated to be 0.26 micrometers.

With respect to the tin-plated product thus produced, the analysis of the plating layers, the calculation of the arithmetic average roughness Ra and maximum height Ry of the surface thereof, and the calculation of the average value of the angles θ and the coefficient of dynamic friction were carried out by the same methods as those in Example 1. In addition, the contact resistance of the tin-plated product was obtained by the same method as that in Example 1, and the maximum value of the electrical resistance of the tin-plated product during the sliding test was obtained by the same method as that in Example 1. Furthermore, in the plated product after being plated with tin, the ratio of the thickness of the tin plating layer to the thickness of the copper plating layer was 2.3, and the ratio of the thickness of the tin plating layer to the sum of the thickness of the copper plating layer and the thickness of nickel plating layer was 1.16.

As a result, it was confirmed that the outermost layer was composed of Sn and $Cu_6Sn_5$ (copper-tin alloy) and that recessed portions were formed (between adjacent crystal grains of the copper-tin alloy) on the surface of the copper-tin alloy layer formed of the crystal grains of the copper-tin alloy, each of the recessed portions having a tin layer of tin therein, so that the copper-tin alloy layer and the tin layers existed on the outermost surface. The thickness of the tin layers was 0.08 micrometers, and the thickness of the copper-tin alloy layer was 0.70 micrometers. It was also confirmed by SEM that the recessed portions (in which tin had remained) were formed on the surface of the copper-tin alloy layer. The average particle diameter of the crystal grains of the copper-tin alloy on the outermost surface was calculated. As a result, the average particle diameter thereof was 1.6 micrometers. Furthermore, the ratio (D/T) of the average particle diameter (D) of the crystal grains of the copper-tin alloy of the outermost layer to the maximum thickness (T) of the tin layer was calculated. As a result, the ratio (D/T) was 5.33. The area (area ratio of tin) occupied by the tin layer on the outermost surface was 35%, and the maximum depth of the recessed portions (the maximum thickness of the tin layers) was 0.30 micrometers.

The underlying layer formed on the surface of the substrate of the tin-plated product was composed of at least one of nickel and a copper-nickel alloy, and the thickness of the underlying layer was 0.30 micrometers. As the intermediate layer between the outermost layer and underlying layer of the tin-plated product, no copper layer existed, so that the outermost layer was formed on the surface of the underlying layer.

The arithmetic average roughness Ra of the surface of the tin-plated product was 0.14 micrometers, the maximum height Ry thereof was 1.01 micrometers, and the average value of the angles θ was 35.5°. The coefficient of dynamic friction in the case of the load of 0.7 N and 5 N was 0.24 and 0.23, respectively. The contact resistance of the tin-plated product was 1.3 mΩ, and the contact resistance of the tin-plated product after being allowed to stand at the high temperature was 48 m Ω. The maximum value of the electrical resistance of the tin-plated product during the sliding test was a low value of 9.5 mΩ.

Example 4

A tin-plated product was produced by the same method as that in Example 1, except that the thickness of the copper plating layer was 0.3 micrometers, the thickness of the tin plating layer being 0.7 micrometers, the temperature in the heat treatment being 600° C., and the holding time in the heat treatment being 40 seconds. Furthermore, in this example, during the holding time of 40 seconds in the heat treatment, the holding time after melting tin was 30 seconds, so that the thickness of tin consumed after melting tin was calculated to be 0.32 micrometers.

With respect to the tin-plated product thus produced, the analysis of the plating layers, the calculation of the arithmetic average roughness Ra and maximum height Ry of the surface thereof, and the calculation of the average value of the angles θ and the coefficient of dynamic friction were carried out by the same methods as those in Example 1. In addition, the contact resistance of the tin-plated product was obtained by the same method as that in Example 1, and the maximum value of the electrical resistance of the tin-plated product during the sliding test was obtained by the same method as that in Example 1. Furthermore, in the plated product after being plated with tin, the ratio of the thickness of the tin plating layer to the thickness of the copper plating layer was 2.3, and the ratio of the thickness of the tin plating layer to the sum of the thickness of the copper plating layer and the thickness of nickel plating layer was 1.75.

As a result, it was confirmed that the outermost layer was composed of Sn and $Cu_6Sn_5$ (copper-tin alloy) and that recessed portions were formed (between adjacent crystal grains of the copper-tin alloy) on the surface of the copper-tin alloy layer formed of the crystal grains of the copper-tin alloy, each of the recessed portions having a tin layer of tin therein, so that the copper-tin alloy layer and the tin layers existed on the outermost surface. The thickness of the tin layers was 0.07 micrometers, and the thickness of the copper-tin alloy layer was 0.70 micrometers. It was also confirmed by SEM that the recessed portions (in which tin had remained) were formed on the surface of the copper-tin alloy layer. The average particle diameter of the crystal grains of the copper-tin alloy on the outermost surface was calculated. As a result, the average particle diameter thereof was 1.5 micrometers. Furthermore, the ratio (D/T) of the average particle diameter (D) of the crystal grains of the copper-tin alloy of the outermost layer to the maximum thickness (T) of the tin layer was calculated. As a result, the ratio (D/T) was 4.29. The area (area ratio of tin) occupied by the tin layer on the outermost surface was 51%, and the maximum depth of the recessed portions (the maximum thickness of the tin layers) was 0.35 micrometers.

The underlying layer formed on the surface of the substrate of the tin-plated product was composed of at least one of nickel and a copper-nickel alloy, and the thickness of the underlying layer was 0.10 micrometers. As the intermediate layer between the outermost layer and underlying layer of the tin-plated product, no copper layer existed, so that the outermost layer was formed on the surface of the underlying layer.

The arithmetic average roughness Ra of the surface of the tin-plated product was 0.16 micrometers, the maximum height Ry thereof was 1.19 micrometers, and the average value of the angles θ was 32.2°. The coefficient of dynamic friction in the case of the load of 0.7 N and 5 N was 0.22 and 0.25, respectively. The contact resistance of the tin-plated product was 1.2 mΩ, and the contact resistance of the tin-plated product after being allowed to stand at the high temperature was 10 m Ω. The maximum value of the electrical resistance of the tin-plated product during the sliding test was a low value of 8.0 mΩ.

Example 5

A tin-plated product was produced by the same method as that in Example 1, except that the arithmetic average roughness Ra, maximum height Ry and ten-point average roughness Rz of the substrate after the surface treatment were 0.12 micrometers, 0.95 micrometers and 0.68 micrometers, respectively, and that the temperature in the heat treatment was 700° C., the holding time in the heat treatment being 13 seconds. Furthermore, in this example, during the holding time of 13 seconds in the heat treatment, the holding time after melting tin was 6.5 seconds, so that the thickness of tin consumed after melting tin was calculated to be 0.31 micrometers.

With respect to the tin-plated product thus produced, the analysis of the plating layers, the calculation of the arithmetic average roughness Ra and maximum height Ry of the surface thereof, and the calculation of the average value of the angles θ and the coefficient of dynamic friction were carried out by the same methods as those in Example 1. In addition, the contact resistance of the tin-plated product was obtained by the same method as that in Example 1, and the maximum value of the electrical resistance of the tin-plated product during the sliding test was obtained by the same method as that in Example 1. Furthermore, in the plated product after being plated with tin, the ratio of the thickness of the tin plating layer to the thickness of the copper plating layer was 2.5, and the ratio of the thickness of the tin plating layer to the sum of the thickness of the copper plating layer and the thickness of the nickel plating layer was 2.

As a result, it was confirmed that the outermost layer was composed of Sn and $Cu_6Sn_5$ (copper-tin alloy) and that recessed portions were formed (between adjacent crystal grains of the copper-tin alloy) on the surface of the copper-tin alloy layer formed of the crystal grains of the copper-tin alloy, each of the recessed portions having a tin layer of tin therein, so that the copper-tin alloy layer and the tin layers existed on the outermost surface. The thickness of the tin layers was 0.29 micrometers, and the thickness of the copper-tin alloy layer was 0.95 micrometers. It was also confirmed by SEM that the recessed portions (in which tin had remained) were formed on the surface of the copper-tin alloy layer. The average particle diameter of the crystal grains of the copper-tin alloy on the outermost surface was calculated. As a result, the average particle diameter thereof was 1.9 micrometers. Furthermore, the ratio (D/T) of the average particle diameter (D) of the crystal grains of the copper-tin alloy of the outermost layer to the maximum thickness (T) of the tin layer was calculated. As a result, the ratio (D/T) was 2.11. The area (area ratio of tin) occupied by the tin layer on the outermost surface was 67%, and the maximum depth of the recessed portions (the maximum thickness of the tin layers) was 0.90 micrometers.

The underlying layer formed on the surface of the substrate of the tin-plated product was composed of at least one of nickel and a copper-nickel alloy, and the thickness of the underlying layer was 0.10 micrometers. As the intermediate layer between the outermost layer and underlying layer of the tin-plated product, no copper layer existed, so that the outermost layer was formed on the surface of the underlying layer.

The arithmetic average roughness Ra of the surface of the tin-plated product was 0.17 micrometers, the maximum height Ry thereof was 1.18 micrometers, and the average value of the angles θ was 28.5°. The coefficient of dynamic friction in the case of the load of 0.7 N and 5 N was 0.25 and 0.24, respectively. The contact resistance of the tin-plated product was 1.3 mΩ, and the contact resistance of the tin-plated product after being allowed to stand at the high temperature was 22 mΩ. The maximum value of the electrical resistance of the tin-plated product during the sliding test was a low value of 7.5 mΩ.

Example 6

A tin-plated product was produced by the same method as that in Example 1, except that the arithmetic average roughness Ra, maximum height Ry and ten-point average roughness Rz of the substrate after the surface treatment were 0.08 micrometers, 0.69 micrometers, 0.53 micrometers, respectively, and that the thickness of the nickel plating layer was 0.3 micrometers, the thickness of the copper plating layer being 0.3 micrometers, the thickness of the tin plating layer being 0.7 micrometers, and the holding time in the heat treatment being 120 seconds. Furthermore, in this example, during the holding time of 120 seconds in the heat treatment, the holding time after melting tin was 60 seconds, so that the thickness of tin consumed after melting tin was calculated to be 0.31 micrometers.

With respect to the tin-plated product thus produced, the analysis of the plating layers, the calculation of the arithmetic average roughness Ra and maximum height Ry of the surface thereof, and the calculation of the average value of the angles θ and the coefficient of dynamic friction were carried out by the same methods as those in Example 1. In addition, the contact resistance of the tin-plated product was obtained by the same method as that in Example 1, and the maximum value of the electrical resistance of the tin-plated product during the sliding test was obtained by the same method as that in Example 1. Furthermore, in the plated product after being plated with tin, the ratio of the thickness of the tin plating layer to the thickness of the copper plating layer was 2.3, and the ratio of the thickness of the tin plating layer to the sum of the thickness of the copper plating layer and the thickness of nickel plating layer was 1.16.

As a result, it was confirmed that the outermost layer was composed of Sn and $(Cu,Ni)_6Sn_5$ (copper-tin alloy) and that recessed portions were formed (between adjacent crystal grains of the copper-tin alloy) on the surface of the copper-tin alloy layer formed of the crystal grains of the copper-tin alloy, each of the recessed portions having a tin layer of tin therein, so that the copper-tin alloy layer and the tin layers existed on the outermost surface. The thickness of the tin layers was 0.07 micrometers, and the thickness of the copper-tin alloy layer was 0.70 micrometers. It was also confirmed by SEM that the recessed portions (in which tin had remained) were formed on the surface of the copper-tin alloy layer. The average particle diameter of the crystal grains of the copper-tin alloy on the outermost surface was calculated. As a result, the average particle diameter thereof was 1.7 micrometers. Furthermore, the ratio (D/T) of the average particle diameter (D) of the crystal grains of the copper-tin alloy of the outermost layer to the maximum thickness (T) of the tin layer was calculated. As a result, the ratio (D/T) was 5.67. The area (area ratio of tin) occupied by the tin layer on the outermost surface was 45%, and the maximum depth of the recessed portions (the maximum thickness of the tin layers) was 0.30 micrometers.

The underlying layer formed on the surface of the substrate of the tin-plated product was composed of at least one of nickel and a copper-nickel alloy, and the thickness of the underlying layer was 0.30 micrometers. As the intermediate layer between the outermost layer and underlying layer of the tin-plated product, no copper layer existed, so that the outermost layer was formed on the surface of the underlying layer.

The arithmetic average roughness Ra of the surface of the tin-plated product was 0.15 micrometers, the maximum height Ry thereof was 1.15 micrometers, and the average value of the angles θ was 35.5°. The coefficient of dynamic friction in the case of the load of 0.7 N and 5 N was 0.25 and 0.25, respectively. The contact resistance of the tin-plated product was 1.2 mΩ, and the contact resistance of the tin-plated product after being allowed to stand at the high temperature was 50 m Ω. The maximum value of the electrical resistance of the tin-plated product during the sliding test was a low value of 9.0 mΩ.

Example 7

A tin-plated product was produced by the same method as that in Example 1, except that the arithmetic average roughness Ra, maximum height Ry and ten-point average roughness Rz of the substrate after the surface treatment were 0.07 micrometers, 0.52 micrometers and 0.41 micrometers, respectively, and that the thickness of the nickel plating layer was 0.1 micrometers, the thickness of the copper plating layer being 0.3 micrometers, the thickness of the tin plating layer being 0.6 micrometers, the temperature in the heat treatment being 700° C., and the holding time in the heat treatment being 5 seconds.

With respect to the tin-plated product thus produced, the analysis of the plating layers, the calculation of the arithmetic average roughness Ra and maximum height Ry of the surface thereof, and the calculation of the average value of the angles θ and the coefficient of dynamic friction were carried out by the same methods as those in Example 1. In addition, the contact resistance of the tin-plated product was obtained by the same method as that in Example 1, and the maximum value of the electrical resistance of the tin-plated product during the sliding test was obtained by the same method as that in Example 1. Furthermore, in the plated product after being plated with tin, the ratio of the thickness of the tin plating layer to the thickness of the copper plating layer was 2, and the ratio of the thickness of the tin plating layer to the sum of the thickness of the copper plating layer and the thickness of nickel plating layer was 1.5.

As a result, it was confirmed that the outermost layer was composed of Sn and $Cu_6Sn_5$ (copper-tin alloy) and that recessed portions were formed (between adjacent crystal grains of the copper-tin alloy) on the surface of the copper-tin alloy layer formed of the crystal grains of the copper-tin alloy, each of the recessed portions having a tin layer of tin therein, so that the copper-tin alloy layer and the tin layers existed on the outermost surface. The thickness of the tin layers was 0.14 micrometers, and the thickness of the copper-tin alloy layer was 0.70 micrometers. It was also confirmed by SEM that the recessed portions (in which tin had remained) were formed on the surface of the copper-tin alloy layer. The average particle diameter of the crystal grains of the copper-tin alloy on the outermost surface was calculated. As a result, the average particle diameter thereof was 2.5 micrometers. Furthermore, the ratio (D/T) of the average particle diameter (D) of the crystal grains of the copper-tin alloy of the outermost layer to the maximum thickness (T) of the tin layer was calculated. As a result, the ratio (D/T) was 6.76. The area (area ratio of tin) occupied by the tin layer on the outermost surface was 63%, and the maximum depth of the recessed portions (the maximum thickness of the tin layers) was 0.37 micrometers.

The underlying layer formed on the surface of the substrate of the tin-plated product was composed of at least one of nickel and a copper-nickel alloy, and the thickness of the underlying layer was 0.1 micrometers. As the intermediate layer between the outermost layer and underlying layer of the tin-plated product, no copper layer existed, so that the outermost layer was formed on the surface of the underlying layer.

The arithmetic average roughness Ra of the surface of the tin-plated product was 0.06 micrometers, and the maximum height Ry thereof was 0.45 micrometers. The coefficient of dynamic friction in the case of the load of 0.7 N and 5 N was 0.21 and 0.22, respectively. The contact resistance of the tin-plated product was 1.5 mΩ, and the maximum value of the electrical resistance of the tin-plated product during the sliding test was a low value of 16.1 mΩ.

Comparative Example 1

A tin-plated product was produced by the same method as that in Example 1, except that the surface of the substrate was treated with a ceramic rolling mill roll, the surface of which was not polished, to cause the arithmetic average roughness Ra, maximum height Ry and ten-point average roughness Rz of the surface thereof to be 0.15 micrometers, 1.78 micrometers and 1.15 micrometers, respectively, and that the thickness of the nickel plating layer was 0.3 micrometers, the thickness of the copper plating layer being 0.7 micrometers, the thickness of the tin plating layer being 0.7 micrometers, the temperature in the heat treatment being 600° C., and the holding time in the heat treatment being 20 seconds. Furthermore, in this comparative example, during the holding time of 20 seconds in the heat treatment, the holding time after melting tin was 10 seconds, so that the thickness of tin consumed after melting tin was calculated to be 0.19 micrometers.

With respect to the tin-plated product thus produced, the analysis of the plating layers, the calculation of the arithmetic average roughness Ra and maximum height Ry of the surface thereof, and the calculation of the coefficient of dynamic friction were carried out by the same methods as those in Example 1. In addition, the contact resistance of the tin-plated product was obtained by the same method as that in Example 1, and the maximum value of the electrical resistance of the tin-plated product during the sliding test was obtained by the same method as that in Example 1. Furthermore, in the plated product after being plated with tin, the ratio of the thickness of the tin plating layer to the thickness of the copper plating layer was 1, and the ratio of the thickness of the tin plating layer to the sum of the thickness of the copper plating layer and the thickness of nickel plating layer was 0.7.

As a result, it was confirmed that the outermost layer was composed of Sn and $Cu_6Sn_5$ (copper-tin alloy) and that recessed portions were formed (between adjacent crystal grains of the copper-tin alloy) on the surface of the copper-tin alloy layer formed of the crystal grains of the copper-tin alloy, each of the recessed portions having a tin layer of tin therein, so that the copper-tin alloy layer and the tin layers existed on the outermost surface. The thickness of the tin layers was 0.04 micrometers, and the thickness of the copper-tin alloy layer was 0.95 micrometers. The shape of grains of the copper-tin alloy layer was not confirmed by SEM, and it was also confirmed by SEM that the recessed portions (in which tin had remained) were formed on the surface of the copper-tin alloy layer formed by bonding the crystal grains to each other. The area (area ratio of tin) occupied by the tin layer on the outermost surface was 8%, and the maximum depth of the recessed portions (the maximum thickness of the tin layers) was 0.15 micrometers.

The underlying layer formed on the surface of the substrate of the tin-plated product was composed of at least one of nickel and a copper-nickel alloy, and the thickness of the underlying layer was 0.30 micrometers. As the intermediate layer between the outermost layer and underlying layer of the tin-plated product, there was formed a copper layer having a thickness of 0.20 micrometers, so that the outermost layer was formed on the surface of the intermediate layer.

The arithmetic average roughness Ra of the surface of the tin-plated product was 0.23 micrometers, and the maximum height Ry thereof was 1.85 micrometers. The coefficient of dynamic friction in the case of the load of 0.7 N and 5 N was 0.38 and 0.29, respectively. The contact resistance of the tin-plated product was 1.4 mΩ, and the contact resistance of the tin-plated product after being allowed to stand at the high temperature was 24 mΩ. The maximum value of the electrical resistance of the tin-plated product during the sliding test was a high value of 150 mΩ.

Comparative Example 2

A tin-plated product was produced by the same method as that in Example 1, except that the surface of the substrate was treated with a ceramic rolling mill roll, the surface of which was not polished, to cause the arithmetic average roughness Ra, maximum height Ry and ten-point average roughness Rz of the surface thereof to be 0.15 micrometers, 1.65 micrometers and 0.94 micrometers, respectively, and that nickel plating and copper plating were not carried out, the temperature in the heat treatment being 700° C., and the holding time in the heat treatment being 6.5 seconds. Furthermore, in this comparative example, during the holding time of 6.5 seconds in the heat treatment, the holding time after melting tin was 0 second, so that the thickness of tin consumed after melting tin was calculated to be 0 micrometer.

With respect to the tin-plated product thus produced, the analysis of the plating layers, the calculation of the arithmetic average roughness Ra and maximum height Ry of the surface thereof, the calculation of the average value of the angles θ and the coefficient of dynamic friction were carried out by the same methods as those in Example 1. In addition, the contact resistance of the tin-plated product was obtained by the same method as that in Example 1, and the maximum value of the electrical resistance of the tin-plated product during the sliding test was obtained by the same method as that in Example 1.

As a result, it was confirmed that the outermost layer was composed of Sn and that the thickness of the tin layer was 0.57 micrometers. The area (area ratio of tin) occupied by the tin layer on the outermost surface was 100%, and the maximum depth of the recessed portion (the maximum thickness of the tin layer) was 1.00 micrometers.

As the underlying layer formed on the surface of the tin-plated product, there was formed a copper-tin alloy layer of $Cu_6Sn_5$ having a thickness of 0.90 micrometers. The outermost tin layer was removed to observe the surface of the copper-tin alloy layer by SEM to calculate the average particle diameter of crystal grains of the copper-tin alloy. As a result, the average particle was 1.1 micrometers. Furthermore, the ratio (D/T) of the average particle diameter (D) of the crystal grains of the copper-tin alloy of the outermost layer to the maximum thickness (T) of the tin layer was calculated. As a result, the ratio (D/T) was 1.10. As the intermediate layer between the outermost layer and substrate of the tin-plated product, no copper layer existed, so that the outermost layer was formed on the surface of the underlying layer.

The arithmetic average roughness Ra of the surface of the tin-plated product was 0.06 micrometers, the maximum height Ry thereof was 0.49 micrometers, and the average value of the angles θ was 56.0°. The coefficient of dynamic friction in the case of the load of 0.7 N and 5 N was 0.41 and 0.32, respectively. The contact resistance of the tin-plated product was 1.2 mΩ, and the contact resistance of the tin-plated product after being allowed to stand at the high temperature was 110 mΩ. The maximum value of the electrical resistance of the tin-plated product during the sliding test was a low value of 25 mΩ.

Comparative Example 3

A tin-plated product was produced by the same method as that in Example 1, except that the thickness of the copper plating layer was 0.2 micrometers, the thickness of the tin plating layer being 0.5 micrometers, the temperature in the heat treatment being 600° C., and the holding time in the heat treatment being 30 seconds. Furthermore, in this comparative example, during the holding time of 30 seconds in the heat treatment, the holding time after melting tin was 20 seconds, so that the thickness of tin consumed after melting tin was calculated to be 0.26 micrometers.

With respect to the tin-plated product thus produced, the analysis of the plating layers, the calculation of the arithmetic average roughness Ra and maximum height Ry of the surface thereof, and the calculation of the coefficient of dynamic friction were carried out by the same methods as those in Example 1. In addition, the contact resistance of the tin-plated product was obtained by the same method as that in Example 1, and the maximum value of the electrical resistance of the tin-plated product during the sliding test was obtained by the same method as that in Example 1. Furthermore, in the plated product after being plated with tin, the ratio of the thickness of the tin plating layer to the thickness of the copper plating layer was 2.5, and the ratio of the thickness of the tin plating layer to the sum of the thickness of the copper plating layer and the thickness of nickel plating layer was 1.7.

As a result, it was confirmed that the outermost layer was composed of Sn and $Cu_6Sn_5$ (copper-tin alloy) and that recessed portions were formed (between adjacent crystal grains of the copper-tin alloy) on the surface of the copper-tin alloy layer formed of the crystal grains of the copper-tin alloy, each of the recessed portions having a tin layer of tin therein, so that the copper-tin alloy layer and the tin layers existed on the outermost surface. The thickness of the tin layers was 0.04 micrometers, and the thickness of the copper-tin alloy layer was 0.45 micrometers. The shape of grains of the copper-tin alloy layer was not confirmed by SEM, and it was also confirmed by SEM that the recessed portions (in which tin had remained) were formed on the surface of the copper-tin alloy layer formed by bonding the crystal grains to each other. The area (area ratio of tin) occupied by the tin layer on the outermost surface was 15%, and the maximum depth of the recessed portions (the maximum thickness of the tin layers) was 0.20 micrometers.

The underlying layer formed on the surface of the substrate of the tin-plated product was composed of at least one of nickel and a copper-nickel alloy, and the thickness of the underlying layer was 0.15 micrometers. As the intermediate layer between the outermost layer and underlying layer of the tin-plated product, no copper layer existed, so that the outermost layer was formed on the surface of the underlying layer.

The arithmetic average roughness Ra of the surface of the tin-plated product was 0.15 micrometers, and the maximum height Ry thereof was 1.10 micrometers. The coefficient of dynamic friction in the case of the load of 0.7 N and 5 N was 0.23 and 0.23, respectively. The contact resistance of the tin-plated product was 1.3 mΩ, and the contact resistance of the tin-plated product after being allowed to stand at the high temperature was 32 mΩ. The maximum value of the electrical resistance of the tin-plated product during the sliding test was a high value of 53 mΩ.

Comparative Example 4

A tin-plated product was produced by the same method as that in Example 1, except that the surface of the substrate was treated with a ceramic rolling mill roll, the surface of which was not polished, to cause the arithmetic average roughness Ra, maximum height Ry and ten-point average roughness Rz of the surface thereof to be 0.20 micrometers, 2.30 micrometers and 1.58 micrometers, respectively, and that the thickness of the copper plating layer was 0.3 micrometers, the thickness of the tin plating layer being 0.7 micrometers, and the holding time in the heat treatment being 120 seconds. Furthermore, in this comparative example, during the holding time of 120 seconds in the heat treatment, the holding time after melting tin was 60 second, so that the thickness of tin consumed after melting tin was calculated to be 0.31 micrometers.

With respect to the tin-plated product thus produced, the analysis of the plating layers, the calculation of the arithmetic average roughness Ra and maximum height Ry of the surface thereof, the calculation of the average value of the angles θ and the coefficient of dynamic friction were carried out by the same methods as those in Example 1. In addition, the contact resistance of the tin-plated product was obtained by the same method as that in Example 1, and the maximum value of the electrical resistance of the tin-plated product during the sliding test was obtained by the same method as that in Example 1. Furthermore, in the plated product after being plated with tin, the ratio of the thickness of the tin plating layer to the thickness of the copper plating layer was 2.3, and the ratio of the thickness of the tin plating layer to the sum of the thickness of the copper plating layer and the thickness of nickel plating layer was 1.75.

As a result, it was confirmed that the outermost layer was composed of Sn and $Cu_6Sn_5$ (copper-tin alloy) and that recessed portions were formed (between adjacent crystal grains of the copper-tin alloy) on the surface of the copper-tin alloy layer formed of the crystal grains of the copper-tin alloy, each of the recessed portions having a tin layer of tin therein, so that the copper-tin alloy layer and the tin layers existed on the outermost surface. The thickness of the tin layers was 0.07 micrometers, and the thickness of the copper-tin alloy layer was 0.55 micrometers. It was also confirmed by SEM that the recessed portions (in which tin had remained) were formed on the surface of the copper-tin alloy layer. The average particle diameter of the crystal grains of the copper-tin alloy on the outermost surface was calculated. As a result, the average particle diameter thereof was 1.6 micrometers. Furthermore, the ratio (D/T) of the average particle diameter (D) of the crystal grains of the copper-tin alloy of the outermost layer to the maximum thickness (T) of the tin layer was calculated. As a result, the ratio (D/T) was 6.40. The area (area ratio of tin) occupied by the tin layer on the outermost surface was 10%, and the maximum depth of the recessed portions (the maximum thickness of the tin layers) was 0.25 micrometers.

The underlying layer formed on the surface of the substrate of the tin-plated product was composed of at least one of nickel and a copper-nickel alloy, and the thickness of the underlying layer was 0.10 micrometers. As the intermediate layer between the outermost layer and underlying layer of the tin-plated product, no copper layer existed, so that the outermost layer was formed on the surface of the underlying layer.

The arithmetic average roughness Ra of the surface of the tin-plated product was 0.22 micrometers, the maximum height Ry thereof was 1.78 micrometers, and the average value of the angles θ was 35.5°. The coefficient of dynamic friction in the case of the load of 0.7 N and 5 N was 0.36 and 0.26, respectively. The contact resistance of the tin-plated product was 2.5 mΩ, and the contact resistance of the tin-plated product after being allowed to stand at the high temperature was 40 mΩ. The maximum value of the electrical resistance of the tin-plated product during the sliding test was a high value of 120 mΩ.

The producing conditions and characteristics of the tin-plated products in these Examples and Comparative Examples are shown in Tables 1 through 5.

TABLE 1

|  | Ra (μm) | Ry (μm) | Rz (μm) | Sn (μm) | Cu (μm) | Ni (μm) | Ratio of Thickness of Plating Layers |
|---|---|---|---|---|---|---|---|
| Ex. 1 | 0.15 | 1.05 | 0.71 | 1.0 | 0.4 | 0.1 | Sn/Cu = 2.5<br>Sn/(Cu + Ni) = 2 |
| Ex. 2 | 0.15 | 1.05 | 0.71 | 1.0 | 0.2 | 0.1 | Sn/Cu = 5<br>Sn/(Cu + Ni) = 3.3 |
| Ex. 3 | 0.08 | 0.69 | 0.53 | 0.7 | 0.3 | 0.3 | Sn/Cu = 2.3<br>Sn/(Cu + Ni) = 1.16 |
| Ex. 4 | 0.15 | 1.05 | 0.71 | 0.7 | 0.3 | 0.1 | Sn/Cu = 2.3<br>Sn/(Cu + Ni) = 1.75 |
| Ex. 5 | 0.12 | 0.95 | 0.68 | 1.0 | 0.4 | 0.1 | Sn/Cu = 2.5<br>Sn/(Cu + Ni) = 2 |
| Ex. 6 | 0.08 | 0.69 | 0.58 | 0.7 | 0.3 | 0.3 | Sn/Cu = 2.3<br>Sn/(Cu + Ni) = 1.16 |
| Ex. 7 | 0.07 | 0.52 | 0.41 | 0.6 | 0.3 | 0.1 | Sn/Cu = 2<br>Sn/(Cu + Ni) = 1.5 |
| Comp. 1 | 0.14 | 1.78 | 1.15 | 0.7 | 0.7 | 0.3 | Sn/Cu = 1<br>Sn/(Cu + Ni) = 0.7 |
| Comp. 2 | 0.15 | 1.65 | 0.94 | 1.0 | — | — | — |

TABLE 1-continued

|  | Ra (μm) | Ry (μm) | Rz (μm) | Sn (μm) | Cu (μm) | Ni (μm) | Ratio of Thickness of Plating Layers |
|---|---|---|---|---|---|---|---|
| Comp. 3 | 0.15 | 1.05 | 0.71 | 0.5 | 0.2 | 0.1 | Sn/Cu = 2.5<br>Sn/(Cu + Ni) = 1.7 |
| Comp. 4 | 0.20 | 2.30 | 1.58 | 0.7 | 0.3 | 0.1 | Sn/Cu = 2.3<br>Sn/(Cu + Ni) = 1.75 |

TABLE 2

|  | Temperature in Furnace (° C.) | Holding Time (s) | Holding Time after melting tin (s) | Thickness of Plating Layers consumed after melting tin (μm) |
|---|---|---|---|---|
| Ex. 1 | 400 | 150 | 90 | 0.37 |
| Ex. 2 | 400 | 150 | 90 | 0.37 |
| Ex. 3 | 400 | 105 | 45 | 0.26 |
| Ex. 4 | 600 | 40 | 30 | 0.32 |
| Ex. 5 | 700 | 13 | 6.5 | 0.31 |
| Ex. 6 | 400 | 120 | 60 | 0.31 |
| Ex. 7 | 700 | 5 | | |
| Comp. 1 | 600 | 20 | 10 | 0.19 |
| Comp. 2 | 700 | 6.5 | 0 | 0 |
| Comp. 3 | 600 | 30 | 20 | 0.26 |
| Comp. 4 | 400 | 120 | 60 | 0.31 |

TABLE 3

|  | Construction of Outermost Layer | Sn | Cu—Sn alloy | Cu | Ni, CuNi alloy |
|---|---|---|---|---|---|
| | | | Thickness (μm) | | |
| Ex. 1 | Sn + Cu$_6$Sn$_5$ | 0.23 | 0.90 | 0 | 0.10 |
| Ex. 2 | Sn + Cu$_6$Sn$_5$ | 0.22 | 0.55 | 0 | 0.10 |
| Ex. 3 | Sn + Cu$_6$Sn$_5$ | 0.08 | 0.70 | 0 | 0.30 |
| Ex. 4 | Sn + Cu$_6$Sn$_5$ | 0.07 | 0.70 | 0 | 0.10 |
| Ex. 5 | Sn + Cu$_6$Sn$_5$ | 0.29 | 0.95 | 0 | 0.10 |
| Ex. 6 | Sn + (Cu, Ni)$_6$Sn$_5$ | 0.07 | 0.70 | 0 | 0.30 |
| Ex. 7 | Sn + Cu$_6$Sn$_5$ | 0.14 | 0.70 | 0 | 0.10 |
| Comp. 1 | Sn + Cu$_6$Sn$_5$ | 0.04 | 0.95 | 0.20 | 0.30 |
| Comp. 2 | Sn | 0.57 | 0.90 | — | — |
| Comp. 3 | Sn + Cu$_6$Sn$_5$ | 0.04 | 0.45 | 0 | 0.15 |
| Comp. 4 | Sn + Cu$_6$Sn$_5$ | 0.07 | 0.55 | 0 | 0.10 |

TABLE 4

|  | Average Particle Diameter of Sn alloy on Outermost Layer (μm) | Sn Layer Area ratio of Sn (%) | Sn Layer Maximum Thickness (μm) | Average particle diameter of Sn alloy on Outermost Layer/Maximum Thickness of Sn Layer | Surface Roughness Ra (μm) | Surface Roughness Ry (μm) | θ (°) |
|---|---|---|---|---|---|---|---|
| Ex. 1 | 2.8 | 57 | 0.75 | 3.73 | 0.16 | 1.13 | 27.7 |
| Ex. 2 | 1.7 | 56 | 0.55 | 3.09 | 0.14 | 0.85 | 38.8 |
| Ex. 3 | 1.6 | 35 | 0.30 | 5.33 | 0.14 | 1.01 | 35.5 |
| Ex. 4 | 1.5 | 51 | 0.35 | 4.29 | 0.16 | 1.19 | 32.2 |
| Ex. 5 | 1.9 | 67 | 0.90 | 2.11 | 0.17 | 1.18 | 28.5 |
| Ex. 6 | 1.7 | 45 | 0.30 | 5.67 | 0.15 | 1.15 | 35.5 |
| Ex. 7 | 2.5 | 63 | 0.37 | 6.76 | 0.06 | 0.45 | |
| Comp. 1 | — | 8 | 0.15 | — | 0.23 | 1.85 | — |
| Comp. 2 | 1.1 | 100 | 1.00 | 1.10 | 0.06 | 0.49 | 56.0 |
| Comp. 3 | — | 15 | 0.20 | — | 0.15 | 1.10 | — |
| Comp. 4 | 1.6 | 10 | 0.25 | 6.40 | 0.22 | 1.78 | 35.5 |

TABLE 5

|  | Coefficient of Friction 0.7N | Coefficient of Friction 5N | Contact Resistance (mΩ) | Contact Resistance after being allowed to stand at high temperature (mΩ) | Maximum Value of Electrical Resistance during Sliding Test (mΩ) |
|---|---|---|---|---|---|
| Ex. 1 | 0.25 | 0.23 | 1.1 | 25 | 8.5 |
| Ex. 2 | 0.29 | 0.24 | 1.5 | 21 | 18 |
| Ex. 3 | 0.24 | 0.23 | 1.3 | 48 | 9.5 |
| Ex. 4 | 0.22 | 0.25 | 1.2 | 10 | 8.0 |
| Ex. 5 | 0.25 | 0.24 | 1.3 | 22 | 7.5 |
| Ex. 6 | 0.25 | 0.25 | 1.2 | 50 | 9.0 |
| Ex. 7 | 0.21 | 0.22 | 1.5 | | 16.1 |
| Comp. 1 | 0.38 | 0.29 | 1.4 | 24 | 150 |
| Comp. 2 | 0.41 | 0.32 | 1.2 | 110 | 25 |
| Comp. 3 | 0.23 | 0.23 | 1.3 | 32 | 53 |
| Comp. 4 | 0.36 | 0.26 | 2.5 | 40 | 120 |

The invention claimed is:

1. A tin-plated product wherein a surface of a substrate is plated with tin, the tin-plated product comprising:
   a substrate of copper or a copper alloy;
   an underlying layer formed on a surface of the substrate, the underlying layer being formed of at least one of nickel and a copper-nickel alloy; and
   an outermost layer formed on a surface of the underlying layer, the outermost layer being composed of a copper-tin alloy layer and tin layers, the copper-tin alloy layer being formed of a large number of crystal grains of a copper-tin alloy of Cu$_6$Sn$_5$, each of the tin layers being arranged in a corresponding one of recessed portions, each of which is formed between adjacent crystal grains of the large number of crystal grains of the copper-tin alloy, the adjacent crystal grains being adjacent to each other on an outermost surface of the outermost layer,
wherein an area ratio occupied by the tin layers on the outermost surface is 20 to 57%, and the tin layers have a maximum thickness of 0.2 to 1.0 micrometers, the maximum thickness of the tin layers being smaller than an average particle diameter of the crystal grains of the copper-tin alloy, the tin layers having an average thickness of 0.07 to 0.4 micrometers, and
wherein the outermost surface has an arithmetic average roughness Ra of 0.05 to 0.2 micrometers and a maximum height Ry of 0.3 to 1.5 micrometers.

2. A tin-plated product as set forth in claim 1, wherein said crystal grains of said copper-tin alloy have an average particle diameter of 1.5 to 3 micrometers.

3. A tin-plated product as set forth in claim 1, wherein said copper-tin alloy layer has a thickness of 0.4 to 1.5 micrometers.

4. A tin-plated product as set forth in claim 1, wherein said underlying layer has a thickness of 0.05 to 0.5 micrometers.

5. An electrical element which uses a tin-plated product as set forth in claim 1, as a material thereof.

6. A method for producing a tin-plated product, the method comprising the steps of:
treating a surface of a substrate of copper or a copper alloy to cause the surface of the substrate to have an arithmetic average roughness Ra of 0.05 to 0.2 micrometers, a maximum height Ry of 0.4 to 1.5 micrometers and a ten-point average roughness Rz of 0.15 to 1.0 micrometers;
forming a nickel plating layer, a copper plating layer and a tin plating layer on the treated surface of the substrate in this order; and
thereafter, carrying out a heat treatment to form an outermost layer being composed of a copper-tin alloy layer and tin layers, the copper-tin alloy layer being formed of a large number of crystal grains of a copper-tin alloy, each of the tin layers being arranged in a corresponding one of recessed portions, each of which is formed between adjacent crystal grains of the large number of crystal grains of the copper-tin alloy, the adjacent crystal grains being adjacent to each other on an outermost surface of the outermost layer, the heat treatment causing an area ratio occupied by the tin layers on the outermost surface to be 20 to 80% and causing a maximum thickness of the tin layers to be 0.2 to 1.0 micrometers and to be smaller than an average particle diameter of the crystal grains of the copper-tin alloy, the heat treatment being carried out by setting temperature and time in a temperature range of 300 to 800° C. so as to cause said tin layers to have an average thickness of 0.07 to 0.4 micrometers.

7. A method for producing a tin-plated product as set forth in claim 6, wherein said nickel plating layer has a thickness of 0.05 to 0.5 micrometers, and said copper plating layer has a thickness of 0.1 to 0.7 micrometers, said tin plating layer having a thickness of 0.5 to 1.5 micrometers.

8. A method for producing a tin-plated product as set forth in claim 6, wherein a ratio of the thickness of said tin plating layer to the thickness of said copper plating layer is 1.5 to 5, and a ratio of the thickness of said tin plating layer to the sum of the thickness of said copper plating layer and the thickness of said nickel plating layer is 1 to 3.5.

9. A method for producing a tin-plated product as set forth in claim 6, wherein said heat treatment is carried out by setting temperature and time in a temperature range of 300 to 800° C. so as to cause said average particle diameter of the crystal grains of the copper-tin alloy to be 1.5 to 3 micrometers while causing said maximum thickness of the tin layers to be 0.2 to 1.0 micrometers.

10. A method for producing a tin-plate product as set forth in claim 6, wherein said temperature and time in the heat treatment are set so that said heat treatment causes a thickness (μm) of said tin plating layer consumed after being melted to be {thickness (μm) of tin plating layer before heat treatment–0.7 (μm)} or more and to be {thickness (μm) of tin plating layer before heat treatment–0.35 (μm)} or less.

11. A tin-plated product wherein a surface of a substrate is plated with tin, the tin-plated product comprising:
a substrate of copper or a copper alloy;
an underlying layer formed on a surface of the substrate, the underlying layer being formed of at least one of nickel and a copper-nickel alloy; and
an outermost layer formed on a surface of the underlying layer, the outermost layer being composed of a copper-tin alloy layer and tin layers, the copper-tin alloy layer being formed of a large number of crystal grains of a copper-tin alloy of $Cu_6Sn_5$, each of the tin layers being arranged in a corresponding one of recessed portions, each of which is formed between adjacent crystal grains of the large number of crystal grains of the copper-tin alloy, the adjacent crystal grains being adjacent to each other on an outermost surface of the outermost layer,
wherein an area ratio occupied by the tin layers on the outermost surface is 20 to 80%, and a maximum thickness of the tin layers is smaller than an average particle diameter of the crystal grains of the copper-tin alloy, and
wherein the outermost surface has an arithmetic average roughness Ra of 0.05 to 0.2 micrometers and a maximum height Ry of 0.3 to 1.5 micrometers.

12. A tin-plated product as set forth in claim 11, wherein said crystal grains of said copper-tin alloy have an average particle diameter of 1.5 to 3 micrometers.

13. A tin-plated product as set forth in claim 11, wherein said maximum thickness of said tin layers is 0.2 to 1.0 micrometers.

14. A tin-plated product as set forth in claim 11, wherein said tin layers have an average thickness of 0.05 to 0.4 micrometers.

15. A tin-plated product as set forth in claim 11, wherein said copper-tin alloy layer has a thickness of 0.4 to 1.5 micrometers.

16. A tin-plated product as set forth in claim 11, wherein said underlying layer has a thickness of 0.05 to 0.5 micrometers.

17. An electrical element which uses a tin-plated product as set forth in claim 11, as a material thereof.

18. A tin-plated product as set forth in claim 11, wherein said copper-tin alloy is formed of $Cu_6Sn_5$.

19. A method for producing a tin-plated product, the method comprising the steps of:
treating a surface of a substrate of copper or a copper alloy to cause the surface of the substrate to have an arithmetic average roughness Ra of 0.05 to 0.2 micrometers, a maximum height Ry of 0.4 to 1.5 micrometers and a ten-point average roughness Rz of 0.15 to 1.0 micrometers;
forming a nickel plating layer, a copper plating layer and a tin plating layer on the treated surface of the substrate in this order; and thereafter, carrying out a heat treatment to form an outermost layer being composed of a copper-tin alloy layer and tin layers, the copper-tin alloy layer being formed of a large number of crystal grains of a copper-tin alloy, each of the tin layers being arranged in a corresponding one of recessed portions, each of which is formed between adjacent crystal grains of the large number of crystal grains of the copper-tin alloy, the adjacent crystal grains being adjacent to each other on an outermost surface of the outermost layer, the heat treatment causing an area ratio occupied by the tin layers on the outermost surface to be 20 to 80% and causing a maximum thickness of the tin layers to be smaller than an average particle diameter of the crystal grains of the copper-tin alloy.

20. A method for producing a tin-plated product as set forth in claim 19, wherein said nickel plating layer has a thickness of 0.05 to 0.5 micrometers, and said copper plating layer has a thickness of 0.1 to 0.7 micrometers, said tin plating layer having a thickness of 0.5 to 1.5 micrometers.

21. A method for producing a tin-plated product as set forth in claim 19, wherein a ratio of the thickness of said tin plating layer to the thickness of said copper plating layer is 1.5 to 5, and a ratio of the thickness of said tin plating layer to the sum of the thickness of said copper plating layer and the thickness of said nickel plating layer is 1 to 3.5.

22. A method for producing a tin-plated product as set forth in claim 19, wherein said heat treatment is carried out by setting temperature and time in a temperature range of 300 to 800° C. so as to cause said average particle diameter of the crystal grains of the copper-tin alloy to be 1.5 to 3 micrometers while causing said maximum thickness of the tin layers to be 0.2 to 1.0 micrometers.

23. A method for producing a tin-plate product as set forth in claim 22, wherein said temperature and time in the heat treatment are set so that said heat treatment causes a thickness ($\mu$m) of said tin plating layer consumed after being melted to be {thickness ($\mu$m) of tin plating layer before heat treatment−0.7 ($\mu$m)} or more and to be {thickness ($\mu$m) of tin plating layer before heat treatment−0.35 ($\mu$m)} or less.

24. A method for producing a tin-plated product as set forth in claim 19, wherein said heat treatment is carried out by setting temperature and time in a temperature range of 300 to 800° C. so as to cause said tin layers to have an average thickness of 0.05 to 0.4 micrometers.

25. A method for producing a tin-plated product as set forth in claim 19, wherein said copper-tin alloy is formed of $Cu_6Sn_5$.

* * * * *